United States Patent [19]
Clark

[11] Patent Number: 4,755,206
[45] Date of Patent: Jul. 5, 1988

[54] RECLAMATION OF SODIUM-CONTAMINATED SOILS

[76] Inventor: Greig J. Clark, 55 Pineland Close N.E., Calgary, Alberta, Canada, T1Y 3H2

[21] Appl. No.: 852,545

[22] Filed: Apr. 16, 1986

Related U.S. Application Data

[63] Continuation-in-part of Ser. No. 649,213, Sep. 10, 1984, abandoned.

[30] Foreign Application Priority Data

Jan. 31, 1984 [CA] Canada .................................. 446458

[51] Int. Cl.$^4$ ................................................ C05G 3/04
[52] U.S. Cl. ............................................ 71/27; 71/59; 71/903; 71/64.08; 106/900; 47/9
[58] Field of Search ................... 71/27, 59, 903, 64.08; 106/900; 47/9

[56] References Cited

U.S. PATENT DOCUMENTS

| | | | |
|---|---|---|---|
| 2,625,529 | 1/1953 | Hedrick et al. | 260/41 |
| 2,651,619 | 1/1951 | De Mello et al. | 106/900 |
| 3,021,298 | 2/1962 | Rakowitz | 260/41 |
| 3,701,384 | 10/1972 | Routson | 166/292 |
| 3,875,697 | 4/1975 | Bracke | 47/9 |
| 3,949,811 | 4/1976 | Threlkeld et al. | 166/294 |

OTHER PUBLICATIONS

Canadian Journal of Soil Science, May 1982, E. De Jong Reclamation of Soils Contaminated by Sodium Chloride.
Effect of Synthetic Polyelectrolytes on the Structure of Saline and Alkali Soil–U.S. Dept. of Agriculture, L. E. Allison, vol. 73, 1952.
Soil and Crop Responses From Field Applications of Soil Conditioners, Martin et al., Ohio Agricultural Experiment Station.
Preliminary Results of an Empirical Study of the Movement of Polymers Through Soil and Their Effect on Disperson of Clay from Aggregates, C. E. Carr et al., Dept. of Soil Science, Univ. of Reading, England.

Primary Examiner—Ferris H. Lander
Attorney, Agent, or Firm—Kerkam, Stowell, Kondracki & Clarke

[57] ABSTRACT

A stable, concentrated solution intended for subsequent aqueous dilution and application to sodium contaminated soils for the productive reclamation thereof is prepared by a process comprising:

(a) preparing an initial aqueous solution having a concentration in the range of from about 1 to 4%% by weight of a water soluble calcium or magnesium salt and dissolving therein from about 1 to 2% by weight of a water soluble polymer having an average molecular weight of at least about 1,00,000;

preparing a substantially saturated aqueous solution of the water soluble calcium or magnesium salt empolyed in step (a); and (c) mixing from about 5 to 20% by volume of the polymer-containing solution of step (a) with from about 80 to 95% by volume of the substantially saturated solution of step (b) to obtain the stable, concentrated solution.

A particularly preferred salt is calcium nitrate and particularly preferred polymers are high molecular weight anionic polyacrylamide polymers. Sodium contaminated soils are productively reclaimed by applying to the surface of such soils an effective volume of a treatment solution obtained by diluting the concentrated solution with sufficient water to provide a treatment solution having a viscosity of no more than about 3 cP (25° C.).

16 Claims, No Drawings

RECLAMATION OF SODIUM-CONTAMINATED SOILS

This is a continuation-in-part of application Ser. No. 649,213, filed Sept. 10, 1984, now abandoned.

FIELD OF THE INVENTION

The present invention relates to a method of productively reclaiming sodium contaminated soils, and to a process for the preparation of a stable, concentrated solution intended for subsequent aqueous dilution to provide a treatment solution for application to the surface of sodium contaminated soils to effect the productive reclamation thereof. Due to percolation of the treatment solution into the soils following surface application, effective treatment of subsoils even beyond the normal zone of cultivation can be obtained. Soils reclaimed by means of the present invention display marked improvement of chemical properties, by virtue of exchange of the sodium ions from the exchange complex of the soil and the subsequent leaching away thereof, and marked improvement of physical properties, as represented by hydraulic conductivity, or permeability, as a result of clay aggregation.

BACKGROUND OF THE INVENTION

The present invention is equally applicable to the productive reclamation of normal soils which have been contaminated by brine spillage or duming from industrial operations, and to native soils exhibiting sodium contamination including, without limitative intent, such native soils as are commonly referred to as sodic, saline, saline-sodic, saline-alkali, solonetzic, solonchaks, etc.

When normal soils are contacted by sodium-rich waters, the sodium ions exchange cations from the exchange complex of the soil, i.e. the reactive clay and humic fractions, by ion exchange. Subsequent exposure to fresh water, for example as a result of natural precipitation, causes the clay aggregates of the soil to hydrate and swell until individual clay particles separate from the aggregates and become dispersed in the pore system of the soil. When this occurs, the movement of air, water and nutrients are restricted, thus rendering the soil less productive or even totally unproductive, in terms of vegetative growth, dependent upon the severity of the sodium contamination. Normal soils rich in reactive clays such as montmorillonites can thus be particularly adversely affected upon sodium contamination and subsequent hydration and dispersion of the clay aggregates.

A variety of methods involving the chemical treatment of soils with calcium salts, or other di- or polyvalent cation-containing compounds, have historically been used in attempts to correct sodium-induced dispersion of clay aggregates. As well, the cultivation of salt tolerant crops and physical treatments like leaching and drainage are at times used to assist in removal of sodium ions from sodium contaminated soils while providing some degree of agricultural productivity during reclamation.

The most commonly used chemical for treatment of sodium contaminated soils has traditionally been gypsum, due both to availability and low cost. Conventionally, the gypsum is applied to the surface of the soil and then incorporated by employing normal cultivation practices. Eventually the gypsum is dissolved by the native soil moisture, by irrigation water or by natural precipitation, or a combination thereof. Calcium ions thereby brought into aqueous solution displace sodium ions from the exchange complex of the soil by ion exchange as the calcium-enriched water percolates through the soil. The sodium ions replaced by calcium ions are then removed with the soil water through drainage, whether by natural drainage or artificial drainage systems. The enrichment of the soil with the calcium ions, that is the exchange of the sodium ions by calcium ions, causes the dispersed clay particles to reaggregate whereby the physical structure of the soil becomes more conducive to movement of the air, water and nutrients necessary for healthy vegetative growth.

There are however a number of disadvantages which restrict the use of gypsum for the reclamation of sodium contaminated soils. By way of example, gypsum has only a low water solubility, such that the concentration that can be dissolved in the soil water may not be sufficient to permit exchange of enough sodium ions to cause reaggregation of deeper subsoils because most of the calcium ions are depleted from the soil water prior to any substantial downward percolation. Since sodium ion replacement by calcium ions is most efficient when the calcium ion concentration is equal to or higher than the sodium ion concentration, a point is thus reached where the deeper penetrating soil waters do not contain sufficient calcium ions for further exchange of sodium ions. Accordingly, the treatment of deeper, sodium contaminated subsoils through the use of gypsum is inefficient or even impossible in cases of severe sodium contamination. Additionally, to maximize the amount of calcium that can be dissolved in the soil water, the gypsum should be incorporated into the soil. This however is often difficult or even impossible with sodium-induced dispersed soils since such soils frequently retain sufficient moisture, i.e. tend to remain substantially water-logged, that conventional cultivation equipment can not be effectively operated.

In efforts to overcome the disadvantages associated with the use of gypsum, the effectiveness of more soluble calcium salts, such as calcium chloride and calcium nitrate, has been investigated by a number of researchers. It was however discovered that the use of highly soluble calcium salts per se was not particularly efficient, due apparently to rapid loss of calcium ions. In this regard, reference may be had to DE JONG, E. 1982. Reclamation of soils contaminated by sodium chloride. Can. J. Soil Sci. 62:351-364, wherein the author stated, on Page 361:

It appears that the high solubility of $Ca(NO_3)_2$ was a disadvantage as it allowed a rapid loss of Ca.

... and concluded, on Page 363:

Surface-applied gypsum and highly soluble amendments such as $Ca(NO_3)_2$ were much less efficient than incorporated gypsum.

Another approach to the chemical reclamation of sodium contaminated dispersed soils has been to apply organic matter in an attempt to improve the physical, i.e. aggregated, structure. Many types of naturally occurring sources of organic matter including manure, straw, hay and sewer sludge have been tried and, while to some extent effective, are not particularly well suited for large scale applications because of problems of availability and associated handling costs.

Hedrick et al U.S. Pat. No. 2,625,529, issued Jan. 13, 1953, and related Hedrick et al Canadian Patent No. 625,135, issued Aug. 8, 1961, teach the improvement of the physical structure of non-sodium contaminated soils by the application of synthetic polyelectrolytes. A number of classes of suitable water soluble polymers are disclosed, effective members of which are said to have a maximum average molecular weight in the order of about 100,000. The polymers are either applied in dry form to the soil surface and then incorporated by cultivation or are sprayed onto the soil surface in the form of aqueous solutions, which may additionally include plant nutrients such as mineral fertilizers. Polymer application rates ranging from 0.001 to 2.0% by weight of the tillable top soil are said to be required, with optimum results reputedly being obtained by the use of from 0.01 to 0.2% by weight of the tillable top soil. Polymer application rates at less than 0.005% by weight of the tillable soil are not however exemplified and, indeed, it seems from the few comparative examples employing a polymer application rate of 0.005% by weight of the tillable soil that higher application rates are apparently more effective.

It has been reported (ALLISON, L. E. 1952. Effect of synthetic polyelectrolytes on the structure of saline and alkali soils. Soil Sci. 73:443–454; and MARTIN, W. P., ENGIBOUS, J. C. and BURNETT, E. 1952. Soil and crop responses from field applications of soil conditions. Soil Sci. 73:455–471) that the application of approximately 0.1% on a dry soil weight basis of the types of synthetic polyelectrolytes generally taught in the aforementioned Hedrick et al patents to the soil surface, followed by mechanical mixing, achieved aggregation of alkali, i.e. sodium-rich, soils. However, economic considerations appeared to preclude large scale applications.

It has also been reported (CARR, C. E. and GREENLAND, D. J. Proceedings Symposium On The Fundamentals of Soil Conditioning, Ghent, Apr. 17–21, 1972, Editor: M. DeBoodt) that high molecular weight polymers, those having an average molecular weight in excess of 70,000, are more effective than low molecular weight polymers in promoting aggregation. However, when such high molecular weight polymers are prepared in aqueous solutions containing a sufficient concentration of polymer to promote effective aggregation, the resultant viscosities are so high that diffusion of the polymer solutions into the soil is severely restricted.

SUMMARY OF THE INVENTION

It has now been unexpectedly discovered that sodium contaminated soils can be productively reclaimed by application to the soil surface of an aqueous treatment solution, having a viscosity of no more than about 3 cP (25° C.), containing both a relatively low concentration of a water soluble polymer, having an average molecular weight of at least about 1,000,000, and a relatively high concentration of a highly water soluble calcium or magnesium salt. Preferred water soluble polymers are anionic polyacrylamide polymers, particularly those having average molecular weights in the range of from about 10,000,000 to 20,000,000. A particularly preferred salt is calcium nitrate. The soil surface applied treatment solution percolates into the soil to promote both a relatively rapid removal of sodium ions, by ion exchange, and a simultaneous improvement in the hydraulic conductivity, as a result of clay reaggregation. It appears that there is some form of synergistic interaction between the polymer and calcium or magnesium salt contained in the aqueous treatment solution, particularly when the aqueous treatment solution has a viscosity in the order of about 1 cP (25° C.), since both more effective sodium ion removal and hydraulic conductivity improvement is realized than with independent applications of the same or even higher concentrations of either the polymer or salt.

A process for the preparation of a stable, concentrated solution intended for subsequent aqueous dilution to yield effective treatment solutions has also been discovered. The ability to prepare a stable, concentrated solution, which can readily be diluted with water at the application site, is of obvious significance from product storage, handling and shipping costs.

In one particular aspect the present invention provides a process for the preparation of a stable, concentrated solution intended for subsequent aqueous dilution and application to sodium contaminated soils, comprising:

(a) preparing an initial aqueous solution having a concentration in the range of from about 1 to 4% by weight of a water soluble calcium or magnesium salt and dissolving therein from about 1 to 2% by weight of a water soluble polymer having an average molecular weight of at least about 1,000,000;

(b) preparing a substantially saturated aqueous solution of the water soluble calcium or magnesium salt employed in step (a); and (c) mixing from about 5 to 20% by volume of the polymer-containing solution of step (a) with from about 80 to 95% by volume of the substantially saturated solution of step (b) to obtain the stable, concentrated solution.

In another particular aspect the present invention provides a process for the preparation of a stable, concentrated solution intended for subsequent aqueous dilution and application to sodium contaminated soils, comprising:

(a) preparing an initial aqueous solution of calcium nitrate having a concentration in the range of from about 1 to 2% by weight and dissolving therein from about 1 to 2% by weight of a water soluble polyacyrlamide polymer having an average molecular weight of at least about 1,000,000;

(b) preparing a substantially saturated aqueous solution of calcium nitrate; and (c) mixing from about 5 to 20% by volume of the polymer-containing solution of step (a) with from about 80 to 95% by volume of the substantially saturated solution of step (b) to obtain the stable, concentrated solution.

In a further particular aspect the present invention provides a process for the preparation of a stable, concentrated solution intended for subsequent aqueous dilution and application to sodium contaminated soils, comprising:

(a) preparing an initial aqueous solution of calcium nitrate having a concentration of about 2% by weight and dissolving therein from about 1 to 2% by weight of an anionic polyacrylamide polymer having an average molecular weight in the range of from about 10,000,000 to 20,000,000;

(b) preparing a substantially saturated aqueous solution of calcium nitrate; and (c) mixing from about 5 to 10% by volume of the polymer containing solution of step (a) with about 90 to 95% by volume of the substantially saturated solution of step (b).

The stable, concentrated solutions obtained by the aforedescribed processes are intended to be diluted with such water as necessary to yield treatment solutions having viscosities of no more than about 3 cP (25° C.), and preferably more in the order of about 1 cP (25° C.), prior to surface application to the sodium contaminated soils to be productively reclaimed. The volume of treatment solution to be applied is dependent upon the degree of sodium contamination of the soil to be productively reclaimed, and can be determined following soil analyses ascertaining the respective sodium, calcium and magnesium on concentrations in saturated soil extracts and the cation exchange content of the soils.

The viscosities referred to throughout this application were measured at a shear rate of 511 reciprocal seconds.

DETAILED DESCRIPTION OF THE INVENTION

As stated previously, it has now been unexpectedly discovered that sodium contaminated soils can be productively reclaimed by application to the soil surface of an aqueous treatment solution, having a viscosity of no more than about 3 cP (25° C.), containing both a relatively low concentration of a water soluble polymer, having an average molecular weight of at least about 1,000,000, and a relatively high concentration of a highly water soluble calcium or magnesium salt.

The viscosities referred to throughout this application were measured at a shear rate of 511 reciprocal seconds.

While high molecular weight members, that is those having an average molecular weight of at least about 1,000,000, of essentially all of the classes of water soluble polyelectrolytes which are disclosed in the previously mentioned Hedrick et al patents can be employed in the present invention, anionic polymers are preferred because they are not as rapidly removed from solution by negatively charged soil clays, thereby permitting deeper soil pentration. Preferred water soluble polymers are anionic polyacrylamide polymers, particularly those having average molecular weights in the range of from about 1,000,000 to 20,000,000, preferably 10,000,000 to 20,000,000. Examples of suitable commercially available polyarylamide polymers are identified in the following table.

TABLE 1

Polyacrylamide Polymers

| Product | Manufacturer | Charge | Approximate Molecular Weight | Form |
|---|---|---|---|---|
| Crosfloc ® CFA 50 | Crossfield Polyelectrolytes | Anionic | 15 × 10⁶ | powdered beads |
| Percol ® 156 | Allied Colloids | Anionic | 12 × 10⁶ | powder |
| Nalco ® 85058 | Nalco | Anionic | 10 × 10⁶ | liquid 50% active in mineral oil |

Preferably about 15 to 30% of the active sites of the anionic polyarylamide polymer are hyrolised to anionic carboxyl functional groups.

Virtually any highly water soluble calcium or magnesium salt can be employer in the present invention, with calcium salts being preferred due to potential magnesium ion toxicity. A particularly preferred salt is calcium nitrate, with calcium chloride being less preferred due to potential chloride ion toxicity. Magnesium nitrate or chloride or hydrates thereof may also be used.

The principal obstacles to the successful preparation of an effective treatment solution containing both a relatively low concentration of a water soluble polymer and a relatively high concentration of a highly water soluble calcium or magnesium salt and, even more so, to the preparation of a stable, concentrated solution which can subsequently be diluted with water at the application site to yield such a treatment solution are that of polymer solubility and solution viscosity.

As is in part evident from Table 2, it is extremely difficult or even impossible to dissolve effective amounts of water soluble high molecular weight polymers in a reasonably concentrated or even substantially saturated calcium or magnesium brine since the polymer will not hydrate. On the other hand, if one attempts to dissolve even about as much as 1 % by weight of water soluble high molecular weight polymer in water, so that it could subsequently be admixed with a substantially saturated brine, the viscosity increases to the extent that complete dissolution of part of the polymer typically is precluded.

It has however been found that concentrations in the order of from about 1 to 2% by weight of water soluble high molecular weight polymer can be fairly readily dissolved in a weak calcium or magnesium brine, i.e. a brine having a calcium or magnesium salt concentration in the range of from about 1 to 4% by weight, and more preferably from about 1 to 2% by weight. Polymer-containing weak brine thereafter can be admixed with from about 80 to 95% by volume of substantially saturated calcium or magnesium brine to obtain a stable, concentrated solution still nearly saturated with the calcium or magnesium salt and containing an acceptably high concentration of polymer.

TABLE 2

Preparation of Polymer/Brine Solutions

| Components of Solution | Remarks |
|---|---|
| 1.0% by weight Crosfloc ® CFA 50 in distilled water | Large lumps of polymer not dissolved after 4 hours stirring. Viscosity of partially dissolved polymer solution 50 cP. |
| 1.0% by weight Crosfloc ® CFA 50 in 2% by weight calcium nitrate aqueous solution | Polymer dissolved completely after stirring 4 hours Viscosity of solution 45 cP. |
| 1.0% by weight Crosfloc ® CFA 50 in 200% by weight calcium nitrate aqueous solution | Polymer not dissolved after 10 hours of stirring, with unhydrated polymer evenly distributed throughout solution |
| 0.1% by weight Crosfloc ® CFA 50 in 200% by weight calcium nitrate aqueous solution | Polymer not dissolved after 10 hours of stirring. No hydration. |
| 0.1% by weight Crosfloc ® CFA 50 in 20% by weight calcium nitrate aqueous solution | Polymer not dissolved after 5 hours of stirring. No hydration. |
| 0.1% by weight Crosfloc ® CFA 50 in 180.2% by weight calcium nitrate aqueous solution prepared by adding 10% by volume of solution containing 1% Crosfloc ® CFA 50 and 2% by weight calcium nitrate aqueous solution to 90% by volume of 200% calcium nitrate aqueous solution | Polymer completely dissolved. Viscosity 3 cP. |
| Procedure | |

All solutions were prepared by adding dry polymer to vortex of distilled water/aqueous solution (≈25° C.) with magnetic

TABLE 2-continued

Preparation of Polymer/Brine Solutions stirrer operating at ≈200 rpm.

Thus, in exemplary general terms, typical stable, concentrated solutions according to the invention are obtained by:

(a) preparing a 1 to 2% by weight calcium nitrate aqueous solution and dissolving therein from about 1 to 2% by of Crosfloc® CFA 50 (an anionic polyacrylamide polymer of approximately $15 \times 10^6$ molecular weight with approximately 35 to 40% of the active sites hydrolyzed to anionic carboxyl functional groups);

(b) preparing a substantially saturated calcium nitrate aqueous solution, i.e. an aqueous solution having a calcium nitrate concentration in the order of about 200% by weight; and (c) mixing from about 5 to 20% by volume of the polymer-containing solution of step (a) with from about 80 to 95% by volume of the substantially saturated calcium nitrate aqueous solution of step (b).

The resultant exemplary stable solutions contain a concentration of from about 160 to 190% by weight of calcium nitrate and from about 0.05 to 0.04% by weight of the anionic polyacrylamide polymer, have a viscosity in the range of from about 3 to 10 cP (25° C.) and a specific gravity of about 15 gm/cc.

It will of course be obvious that the sequence of preparation of the polymer-containing weak calcium nitrate aqueous solution and the substantially saturated calcium nitrate aqueous solution, which are subsequently admixed, is immaterial.

To illustrate the comparative utility of the invention for the productive reclamation of sodium contaminated soils, a series of soil column tests were conducted.

Samples of clay loam soil were dried and sieved to pass through a 4 mm mesh screen. Portions of homogeneous soil were placed in separate 6.3 cm I.D. by 30 cm long acrylic tubes which had a plastic screen and pad of glass wool fastened over one end to retain the soil placed in the acrylic tube. It was determined that 1 kg of wet soil provided a soil column height of approximately 15 cm. (To determine the exact amount of dry soil required to give 1 kg of wet soil a 100 gm portion of dry soil was wetted with water to bring it to saturation, then the appropriate amount of dry soil was placed in each acrylic tube). To compare the ability of various chemical treatments to reclaim sodium contaminated soils, the soil columns were contaminated with a synthetic sodium brine and then dispersed as follows:

(1) The dry soil columns were placed vertically in a container filled with a 10% by weight sodium chloride brine and allowed to become fully saturated;

(2) The saturated soil columns were removed from the 10% by weight sodium chloride brine and the excess brine allowed to drip from the sodium contaminated soils until all excess brine was removed;

(3) The sodium saturated soils were then dispersed by passing 1000 ml. of distilled water through each soil column using a constant hydrostatic head of water equal to 1.5 times the height of the soil column. After 1000 ml. of distilled water has passed through the soil the level of the distilled water was allowed to dissipate until it was just below the surface of the soil;

(4) Separate chemical treatments were carefully applied to the independent columns, as specified, and the time recorded. When applying the treatment as a solution the time required for the solution to permeate just past the soil surface was recorded; and (5) A constant head of distilled water was then applied to the soil column as before and the leachates from the treated soil columns were collected. The volume of leachate was recorded every 30 or 60 minutes and periodically portions of the leachate were chemically analyzed to determine the concentration of the sodium ions removed by the different chemical treatments.

The criteria employed to illustrate the comparative effectiveness of the various treatments were:

(a) the leaching rate and total amount of sodium removed from the contaminated soil columns, as respectively measured by the volume of leachate collected per unit of time and the concentration of sodium in the leachates multiplied by volume; and (b) the saturated hydraulic conductivities of the treated soils, calculated as follows:

$$K = \frac{Q \cdot L}{A \cdot t \cdot \Delta H}$$

where:
Q = volume of leachate (cc)
L = length of soil column (cm)
A = crossectional area of soil column (cm$^2$)
t = time (hr)
H = hydrostatic head (cm of H$_2$O)
K = saturated hydraulic conductivity (cm/hr).

The results of the soil column tests are set out in Table 3, which is based on samples (L = 14.6 cm) of an organic loam soil, and in Table 4, which is based on samples (L = 15.2 cm) of a sandy clay soil.

TABLE 3

SATURATED HYDRAULIC CONDUCTIVITIES AND RATES OF SODIUM REMOVAL FROM SODIUM CONTAMINATED SOIL COLUMNS (L = 14.6 cm) TREATED WITH DIFFERENT CHEMICAL AMENDMENTS

| Treatment | Cummulative Volume (cc)/Saturated Hydraulic Conductivities (cm/hr) Over Time | | | | Total Sodium (mg) Removed In |
|---|---|---|---|---|---|
| | 8 Hours | 24 Hours | 48 Hours | 72 Hours | 72 Hours |
| 1. 5,000 mg of dry gypsum mixed with top 2 cm of wet soil (1 Kg) | 12/0.032 | 23/0.020 | 36/0.016 | 57/0.017 | 99.5 |
| 2. 20,000 mg of dry gypsum mixed with top 2 cm of wet soil (1 Kg) | 120/0.321 | 152/0.135 | 237/0.106 | 290/0.086 | 158.4 |
| 3. 5000 mg of dry calcium nitrate mixed with top 2 cm of wet soil (1 Kg) | 15/0.040 | 28/0.025 | 58/0.026 | 85/0.025 | 81.5 |

TABLE 3-continued

SATURATED HYDRAULIC CONDUCTIVITIES AND RATES OF SODIUM REMOVAL
FROM SODIUM CONTAMINATED SOIL COLUMNS (L = 14.6 cm)
TREATED WITH DIFFERENT CHEMICAL AMENDMENTS

| Treatment | Cummulative Volume (cc)/Saturated Hydraulic Conductivities (cm/hr) Over Time | | | | Total Sodium (mg) Removed In 72 Hours |
|---|---|---|---|---|---|
| | 8 Hours | 24 Hours | 48 Hours | 72 Hours | |
| 4. 50 mg of Crosfloc ® CFA 50 polymer (a) applied as 0.5% by weight aqueous solution to surface of wet soil (1 Kg) | 12/0.032 | 23/0.020 | 35/0.016 | 55/0.016 | 72.1 |
| 5. 1.35 mg of Crosfloc ® CFA 50 polymer and 2566 mg of calcium nitrate in form of solution (b) applied to surface of wet soil (1 Kg) | 70/0.187 | 235/0.209 | 330/0.147 | 385/0.114 | 183.6 |
| 6. 5.5 mg of Crosfloc ® CFA 50 polymer and 10,455 mg of calcium nitrate in form of solution (b) applied to surface of wet soil (1 Kg) | 205/0.548 | 535/0.476 | 832/0.370 | 998/0.296 | 199.0 |

(a) Crosfloc ® CFA 50 is a commercial anionic polyacrylamide polymer of approximately 15 × 10$^6$ molecular weight with approximately 22 to 27% of the active sites hydrolyzed to anionic carboxyl functional groups.
(b) An aqueous concentrated solution containing 190.1% by weight calcium nitrate and 0.1% by weight Crosfloc ® CFA 50 was diluted 1 to 9 with distilled water and the appropriate volume of this diluted solution applied to the soil columns.

TABLE 4

SATURATED HYDRAULIC CONDUCTIVITIES AND RATES OF SODIUM REMOVAL
FROM SODIUM CONTAMINATED AND DISPERSED SOIL COLUMNS (L = 15.2 cm)
TREATED WITH DIFFERENT CHEMICAL AMENDMENTS

| Treatment | Cummulative Volume (cc)/Saturated Hydraulic Conductivities (cm/hr) Over Time | | | Total Sodium (mg) Removed | | |
|---|---|---|---|---|---|---|
| | 24 Hours | 48 Hours | 72 Hours | 24 Hours | 48 Hours | 72 Hours |
| 1. 7.5 mg of Crosfloc ® CFA 50 polymer (a) applied as 7.5 ml of 0.1% by weight aqueous solution | 605/0.539 | 900/0.401 | 1055/0.133 | 32.0 | 37.0 | 39.0 |
| 2. 15.0 mg of Crosfloc ® CFA 50 polymer (a) applied as 7.5 ml of 0.2% by weight aqueous solution | 75/0.067 | 375/0.167 | 460/0.137 | 6.8 | 18.9 | 33.4 |
| 3. 7.5 mg of Crosfloc ® CFA 50 polymer (a) and 13,515 mg calcium nitrate applied as 7.5 ml of 0.1% by weight polymer in 180.2% by weight calcium nitrate aqueous solution | 1050/0.935 | 1840/0.819 | 2420/0.718 | 55.2 | 68.5 | 71.2 |
| 4. 15.0 mg of Crosfloc ® CFA 50 polymer (a) and 13.515 mg calcium nitrate applied as 7.5 ml of 0.2% by weight polymer in 180.2% by weight calcium nitrate aqueous solution | 120/0.107 | 520/0.232 | 595/0.177 | 9.0 | 43.3 | 48.2 |
| 5. 15,000 mg of calcium nitrate applied as 7.5 ml of 200% by weight calcium nitrate aqueous solution | 1175/1.05 | 1975/0.880 | 2650/0.787 | 53.8 | 57.5 | 58.8 |

(a) Crosfloc ® CFA 50 is a commercial anionic polyacrylamide polymer of approximately 15 × 10$^6$ molecular weight with approximately 22 to 27% of the active sites hydrolyzed to anionic carboxyl functional groups.

As will be apparent from Table 3, which includes comparative results of gypsum treatments applied to Samples 1 and 2, the polymer/calcium nitrate solution treatment applied to Sample 5 proved to be considerably more effective than either the independent calcium nitrate treatment applied to Sample 3 or the independent polymer solution treatment applied to Sample 4 even though the concentration of the components in the combined polymer/calcium nitrate solution treatment were appreciably less than those used for the independent calcium nitrate and polymer solution treatments. The polymer/calcium nitrate solution treatment applied to Sample 6 proved to be even significantly more effective than that applied to Sample 5.

The independent polymer solution treatment applied to Sample 4 is also of particular interest, despite the fact that it produced the poorest results, in that it nominally falls within the operative treatment range alleged in the previously mentioned Hedrick et al patents. The poor results are probably attributable to the fact that the viscosity of the 0.5% by weight polymer solution employed to provide the 0.005% by weight polymer based on the weight of the soil was approximately 2250 cP (25° C.) with the apparent result that the viscosity of the solution effectively retarded its passage through the dispersed soil column. Conversely, the polymer/calcium nitrate solution treatments applied to Samples 5 and 6 had a viscosity of approximately 1 cP (25° C.).

Referring now to Table 4, it is clear that the independent polymer solution treatments respectively applied to Samples 1 and 2 in the form of 0.1% by weight or 0.2% by weight polymer solutions are less effective than the corresponding combined polymer/calcium nitrate solutions respectively applied to Samples 3 and 4 in terms of sodium removal efficiency and hydraulic conductivity improvement. The poorer results of the polymer solutions applied to Samples 1 and 2 are again probably attributable to the fact that the viscosities of the respective polymer solutions were approximately 500 and 1020 cP (25° C.). The polymer solution treatment applied to Sample 2, which produced the poorest results, is additionally of particular interest in that it also falls within the reputed operative treatment range of the previously mentioned Hedrick et al patents in that it provided an amount of 0.0015% by weight of polymer based on the weight of the soil.

The polymer/calcium nitrate solution treatments applied to Samples 3 and 4, which essentially represent treatments with undiluted concentrates according to the invention, are also significant from a standpoint of treatment effectiveness versus viscosity. The polymer/calcium nitrate solution treatment applied to Sample 3 had a viscosity of approximately 3 cP (25° C.) and proved to be a significantly more effective treatment than the polymer/calcium nitrate solution treatment applied to Sample 4 which had a viscosity of approximately 8 cP (25° C.).

On the basis of the tests conducted, it appears that optimized sodium removal and hydraulic conductivity improvement are realized only when the viscosity of the polymer/calcium nitrate treatment solutions are no more than about 3 cP (25° C.) as in the case of the treatment solution applied to Sample 3 of Table 4. Even more preferably, the viscosity of the polymer/calcium nitrate treatment solutions is more in the order of about 1 cP (25° C.) as in the case of the treatment solutions applied to Samples 5 and 6 of Table 3.

Thus, for most normal usages, it is intended that the stable, concentrated solutions according to the invention be diluted with at least sufficient water to provide a treatment solution having a viscosity of no more than about 3 cP (25° C.). Preferred dilution rates in a ratio of concentrated solution to water of about 1:7 to about 1:9 are contemplated, although without limitative intent.

An experimental application of a treatment solution according to the invention was undertaken on a 100 foot by 200 foot test plot known to be sodium contaminated. A concentrated aqueous solution containing a concentration of 180.2% by weight of calcium nitrate and 0.1% by weight Crosfloc ® CFA 50 was diluted with water in a ratio of concentrate to water of 1:7 to produce the treatment solution. 135 Imperial Gallons (28080 liters) of this treatment solution were sprayed onto the soil surface of the test plot and thereafter a further 150 Imperial Gallons (31200 liters) of fresh water were sprayed onto the surface of the test plot to promote further leaching. An additional 3 inches of natural precipitation fell on the test plot within the 3 weeks following application of the treatment solution. The results of the experimental application are illustrated in Table 5, as analyses of composite soil extracts taken prior to and 3 weeks after the exerpimental treatment of the test plot, which clearly demonstrate a dramatic reduction, following treatment, of the sodium content.

TABLE 5

Analysis of Saturated Soil Extracts Before and after Treatment

| Parameter | 0-6" Composite Sample Before Treatment | 0-6" Composite Sample After Treatment |
|---|---|---|
| pH | 7.80 | 7.90 |
| CONDUCTIVITY (μMHOS/CM) | 9490 | 2370 |
| CO$_3$ (PPM) | 0 | 0 |
| HCO$_3$ (PPM) | 100 | 100 |
| SO$_4$ (PPM) | 890 | 315 |
| Cl (PPM) | 3950 | 590 |
| Na (PPM) | 1920 | 370 |
| Ca (PPM) | 480 | 180 |
| Mg (PPM) | 180 | 30 |
| K$_2$O (LB./ACRE 6") | 550 | 480 |
| P$_2$O$_5$ (LB./ACRE 6") | 70. | 65. |
| N (LB./ACRE 6") | 65. | 63. |
| SAR | 19.0/1 | 6.7/1 |

*SAR = sodium absorption ratio = $\dfrac{Na}{\sqrt{\dfrac{Ca + Mg}{2}}}$ where Na, Ca, and Mg concentrations are expressed in milligram equivalents It should also be noted, in counterdistinction to the teachings of the previously mentioned Hedrick et al patents, that the highly water soluble calcium or magnesium salt is not employed by the present invention to function as a plant nutrient material, in the sense of a normal fertilizer. The preferred salt, calcium nitrate, is admittedly a long and well known mineral fertilizer but is in fact employed, for purposes of the present invention, at phytotoxic concentrations. Rather the purpose of the highly water soluble calcium or magnesium salt, in the relatively concentrated amounts, is to provide a rich source of divalent ions for exchange with the sodium ions contaminating the reactive clay soil fractions and which, together with the synergistic interaction with the polymer, permit productive reclamation of sodium contaminated soils more rapidly and to greater depths than could previously be achieved.

The following tests and experiments were carried out to further illustrate the present invention.

A. Preparation of Solutions

Using the polymers described in Table 6 below attempts were made to prepare aqueous solutions of these at concentrations of 0.5, 1.0 and 2.0% by weight using deionized water. These same polymers were then used to prepare solutions containing 1.0% by weight of polymer with various calcium and magnesium salts. In all cases the method of solution preparation involved placing the water or brine solution in a beaker then stirring with a magnetic stirrer/hot plate to create a vortex in the solution and then adding the polymer to the edge of the solution vortex over a 10-20 sec period so as to disperse the polymer evenly in the solution before any appreciable solution viscosity developed. To facilitate dissolution of the polymer the stirred solutions were then heated to a maximum of 40° C. Normally complete dissolution occurred within 4 hours but occasional 10 hours of stirring was used.

Substantially saturated aqueous brines of these same calcium or magnesium salts were then prepared and combined with those solutions having 1% by weight of polymer in 1.5% by weight calcium or magnesium brines to provide stable solutions that contained 90 parts by volume of the nearly saturated calcium or magnesium brine and 10 parts by volume of the 1.0% polymer in 1.5% calcium or magnesium solutions.

The resulting concentrated brine solutions then contained 0.1% by wt. of polymer.

Attempts were also made to dissolve 0.1% by weight of these same dry polymers directly in the nearly saturate calcium or magnesium brines.

To demonstrate the viscose properties of these polymer/brine solutions a 20 ml portion of the concentrate brine/0.1% polymer solutions were diluted with 180 mls of deionized water and the resulting solution viscosities determined using a Fann 35 viscometer at a shear speed of 300 RPM (equivalent to shear rate of 511 reciprocal seconds).

The data summarizing the ease of solution preparation, solution stabilities, and 300 RPM viscosities of the diluted polymer/brine solutions are presented in Table 7 below.

Sodium Displacement Tests and Hydraulic Conductivity Improvement Tests

Commercially-available sodium bentonite was obtained from two sources and used in place of sodium-contaminated soils. This naturally occurring clay is a common constituent in many saline/sodic soils in North America and is largely responsible for the dispersed natural and poor hydraulic conductivities of these soils.

To evaluate how effective the various polymer/brine solutions were in displacing sodium from the sodium bentonite and improving their hydraulic conductivities a test procedure was developed to provide quicker results than soil column leaching tests.

The basis for this test procedure relies on the fact that sodium-contaminated clay soils are dispersed and exhibit low hydraulic conductivities. On the other hand, if these "soils" are treated with calcium or magnesium salts and polymers to replace the sodium with the divalent ions and polymer the dispersed soil particles become aggregated.

In the aggregated state these soils exhibit improved hydraulic conductivities. Consquently, the hydraulic conductivities of the treated and dispersed soils can be measured by a simple filtration technique and the resulting filtrates analyzed for sodium to provide a quantitative measure of the effectiveness of the treatment.

In the present method dispersed sodium-contaminated "soils" were simulated by preparing 6% by weight slurries of sodium bentonite in deionized water by initially mixing in a high speed Waring blender than leaving the slurry 24 hours to fully hydrate.

Various polymer and brine solutions were evaluated by mixing 0.5–15.0 milliliter portions into 100 milliliters of the prehydrated sodium bentonite slurries then transferring exactly 50 ml of the treated slurry onto a 5.5 cm diameter Whatman #1 filter paper located in a Buchner funnel. This funnel was in turn fitted to a vacuum flask and the vacuum flask was connected by hose to a vacuum pump. Once the slurry was transferred onto the filter paper the vacuum pump was switched on and a vacuum equivalent to 24 inches of mercury (600 millimeters) was applied on the filter to draw filtrate into the vacuum flask. After exactly 15 min. of continuous vacuum filtration, the vacuum pump was switched off, the exact volume of filtrate recorded, and the filtrate was analyzed for dissolved sodium.

The amount of sodium displaced from exactly 3.0 grams of the sodium bentonite was calculated as follows:

$$\text{Na}^+ \text{ displaced } /3 \text{ gr Na bentonite} = [\text{Na}] \times \frac{\text{filtrate vol.}}{1000} \times \frac{3}{\left(\frac{50}{100 + \text{treatment vol.}} \times 6\right)}$$

where: [Na] = concentration of Na$^+$ in filtrate (mg/L)

The numerical value of the collected filtrate volume can be used to calculate the approximate hydraulic conductivities of the soil slurries by using the following formula and physical dimensions of the filtration apparatus used in these tests.

$$K = \frac{Q \times h \times \mu}{A \times \frac{t}{60} \times \Delta P}$$

where:
$K$ = hydrallic conductivity (cm/hr)
$Q$ = volume of filtrate (cc)
$\mu$ = viscosity of filtrate (cp)
    = 1 (based on dilution of treatment fluids with liquid in slurry)
$A$ = cross-sectional area (cm$^2$) of the filter surface $$= \pi \times \left(\frac{5.5}{2}\right)^2 = 23.76 \text{ cm}^2$$

$t$ = time (min) that vacuum was applied
$\Delta P$ = pressure drop across the filtered slurry
    = 600 millimeters of Hg = 813 cm of water column
$h$ = height of filtered slurry = 2 cm.
Therefore for the present case:
$K = Q \times 4.14 \times 10^{-4}$ (cm/hr)

The test results of the sodium displacement and calculated hydraulic conductivity values are summarized on Table 3 attached.

DISCUSSION OF RESULTS AND CONCLUSIONS

A. Preparation and Viscose Properties of The Polymer and Polymer/Brine Solutions It is obvious from Table 7 below that it is virtually impossible to prepare aqueous solutions of the various polymers at concentrations greater than 0.5% by weight because of the extremely high viscosity imparted by these solutions when only part of the polymer has become hydrated.

The viscose fluid then coats the remaining unhydrating polymer particles and prevents their complete hydration. On the other hand when relatively weak (1% to 4% by weight) brines of soluble calcium or magnesium salts are used in place of fresh water, these dissolved divalent ions appear to suppress the rate of polymer hydration and fluid viscosity so that the entire amount of powdered polymer can be eventually dissolved. The resulting solutions are clear or transparent stable solutions. This method appears to function for preparing anionic, nonionic and even cationic polyacrylamides (as demonstrated in Table 6, however particular interest is in the anionic polyarylamide solutions because of their unique abilities to function synergistically with the calcium and magnesium brines to displace sodium from sodium-contaminated soils.

It is further evident from the data in Table 7 (see Notes), that these solutions containing 1.0% polymer in 1.5% calcium and magnesium salt brines can be used to prepare stable solutions having 0.1% by weight active polymers in nearly saturated calcium or magnesium brines by mixing 10 parts (by volume) of the 1.0% polymer/1.5% calcium or magnesium brines with 90 parts (by volume) of essentially saturated solutions of the same salts. Conversely, it is not possible to dissolve 0.1% by weight of the powdered polymers directly in the nearly saturated calcium or magnesium brines by conventional means.

Table 7 also illustrates that by simple aqueous dilution of 1 part of the solutions containing 0.1% polymer and nearly saturated calcium or magnesium brines with 9 parts of water, the diluted polymer/brine solutions exhibit low viscosities (less than 3 centipoise at 511 reciprocal second shear rates) which facilitates their ease of application to sodium-contamined soils.

B. Sodium Displacement and Hydraulic Conductivity Improvements

The results of tests present in Table 8 demonstrate that the filtration rate test provides a viable means of evaluating the effectiveness of various polymer/divalent brine solutions for their ability to displace sodium from sodium-contaminated soils and to improve the hydraulic conductivities of these soils.

More specifically it can be seen that:
1. All tested anionic polyacrylamide/divalent brine solutions significantly improved the hydraulic conductivities and the amount of sodium displaced from the simulated sodium-contaminated soil slurries. The molecular weight range of the tested anionic polymers was approximately $0.5 \times 10^6$ to $15 \times 10^6$ and their percent of hydrolysis varied from about 15% to 35% (see Table 6).

The polymers having 15%–25% hydrolysis appear to function best.

A comparison of the total amount of sodium removed by aqueous calcium or magnesium brines (without polymer), plus the sodium removed by simple aqueous polymer solutions do not equal the amount of sodium removal achieved by equivalent treatments with solutions containing both polymer and divalent brines. This clearly illustrates an unexpected synergism between the divalent ions and the polymer when present in a common solution.

This same synergism is not displayed by the nonionic polymer/divalent brine solutions. The cationic polymer solutions appear to function in an antagonistic manner when combined with the calcium brine solutions.

While soluble salts of both calcium and magnesium appear to function in improving the hydraulic conductivity and to displace sodium from sodium-contaminated soils, the calcium salts appear to perform better.

TABLE 6

GENERAL PROPERTIES OF COMMERCIALLY AVAILABLE POLYACRYLAMIDE POLYMERS

| COMMERCIAL NAME | IONIC CHARACTER | APPROXIMATE MOLECULAR WEIGHT RANGE | RANGE OF % HYDROLYSIS/ FUNCTIONAL GROUPS |
|---|---|---|---|
| CROSSFLOC CFA-40 | slightly anionic | $15 \times 10^6$ (a) | 15–17% |
| CROSSFLOC CFA-50 | moderately anionic | $15 \times 10^6$ (a) | 22–27% |
| CROSSFLOC CFA-70 | strongly anionic | $15 \times 10^6$ (a) | 30–34% |
| PERCOL 156 | moderately anionic | $5–15 \times 10^6$ (b) | 15–20% |
| SEPARAN AP 273 | moderately anionic | $0.5–5 \times 10^6$ (b) | 15–20% |
| CROSSFIELD CFN-10 | nonionic | $15 \times 10^6$ (a) | N/A |
| PERCOL 140 | cationic | $0.5–5 \times 10^6$ (b) | 10–15% |

Notes:
Source:
(a) Commercial literature and communications with supplier.
(b) "Index of Commercial Flocculants" - 1974, by H. A. Hamza and J. L. Picard, CANMET Report 77-8, Publ. Canada Supply & Services, Ottawa, Canada.

TABLE 7

SOLUTION PROPERTIES OF POLYACRYLAMIDE POLYMERS

| POLYMER | 0.5% polymer in d.* Water | 1.0% polymer in d.* Water | 2.0% polymer in d.* Water | 1.0% polymer in Ca(NO$_3$)$_2$ (a) | 1% polymer in 1.5% CaCl$_2$ (b) | 1% polymer in 1.5% MgCl$_2$ (c) | 300 RPM Viscosity (d) (cp) at 25° C. (1) in Ca(NO$_3$)$_3$ | (2) in CaCl$_2$ | (3) in MgCl$_2$ |
|---|---|---|---|---|---|---|---|---|---|
| CFA-40 | clear, viscose sol'n with all polymer dissolved in 4 hrs. | viscose sol'n mer not dissolved after 10 hrs mixing. | viscose sol'n poly- of polymer undissolved after 10 hrs. mixing. | clear, low large amount in 4 hrs., stable for >1 mo. | clean, low visc. sol'n in 4 hrs., stable for >1 mo. | clear, low visc. sol'n in 4 hrs., stable for >1 mo. | 2.5 visc. sol'n | 2.0 | 2.0 |
| CFA-50 | clear, viscose sol'n with all polymer dissolved in 4 hrs. | viscose sol'n poly- mer not dissolved after 10 hrs mixing. | viscose sol'n large amount of polymer undissolved after 10 hrs. mixing. | clear, low visc. sol'n in 4 hrs., stable for >1 mo. | clean, low visc. sol'n in 4 hrs., stable for >1 mo. | clear, low visc. sol'n in 4 hrs., stable for >1 mo. | 3.0 | 2.5 | 2.5 |
| CFA-70 | clear, viscose sol'n with all polymer dissolved in 4 hrs. | viscose sol'n poly- mer not dissolved after 10 hrs mixing. | viscose sol'n large amount of polymer undissolved after 10 hrs mixing. | clear, low visc sol'n in 4 hrs., stable for >1 mo. | clean, low visc. sol'n in 4 hrs., stable for >1 mo. | clear, low visc sol'n in 4 hrs., stable for >1 mo. | 3.0 | 3.0 | 2.5 |
| PERCOL 156 | translucent, | viscose | viscose sol'n | clear, low | translucent, | clear, low | 3.5 | 3.0 | 3.0 |

TABLE 7-continued
SOLUTION PROPERTIES OF POLYACRYLAMIDE POLYMERS

| | APPEARANCE OF SOLUTIONS | | | | | | 300 RPM Viscosity (d) (cp) at 25° C. | | |
|---|---|---|---|---|---|---|---|---|---|
| POLYMER | 0.5% polymer in d.* Water | 1.0% polymer in d.* Water | 2.0% polymer in d.* Water | 1.0% polymer in Ca(NO$_3$)$_2$ (a) | 1% polymer in 1.5% CaCl$_2$ (b) | 1% polymer in 1.5% MgCl$_2$ (c) | (1) in Ca(NO$_3$)$_3$ | (2) in CaCl$_2$ | (3) in MgCl$_2$ |
| | viscose sol'n all polymer dissolved 4 hrs. | sol'n polymer not dissolved after 10 hrs mixing. | large amount of polymer undissolved after 10 hrs mixing. | visc sol'n in 4 hrs., stable for >1 mo. | low visc. sol'n in 4 hr., stable for >1 min. | visc. sol'n in 4 hrs., stable for >1 mo. | | | |
| SEPARAN AP 273 | translucent, viscose sol'n all polymer dissolved 4 hrs. | viscose sol'n polymer not dissolved after 10 hrs mixing. | viscose sol'n large amount of polymer undissolved after 10 hrs mixing. | clear,low visc sol'n in 4 hrs., stable for >1 mo. | translucent, low visc. sol'n in 4 hr., stable for >1 min. | clear,low visc. sol'n in 4 hrs., stable for >1 mo. | 3.0 | 2.5 | 2.5 |
| CFN-10 | clear,viscose sol'n with all polymer dissolved in 4 hrs. | viscose sol'n polymer not fully dissolved after 10 hrs. mixing | viscose sol'n polymer not dissolved after 10 hrs. mixing. | clear,low visc sol'n attained with 4 hrs. mixing. | clean,low visc. sol'n attained with 4 hrs. mixing. | clear,low visc. sol'n attained with 4 hrs. mixing. | 2.0 | 1.5 | 1.5 |
| PERCOL 140 | clear, viscose sol'n with all polymer dissolved in 4 hrs. | viscose sol'n polymer not fully dissolved after 10 hrs. mixing | viscose sol'n polymer not dissolved after 10 hrs. mixing. | clear,low visc sol'n attained with 4 hrs. mixing. | clean,low visc. sol'n attained with 4 hrs. mixing. | clear,low visc. sol'n attained with 4 hrs. mixing. | 2.5 | 2.0 | 2.0 |

Notes:
d.* - indicates deionized water was used.
(a) 1.5% Ca(NO$_3$)$_2$ prepared from commercially available sprilled calcium nitrate fertilizer (15-0-0).
(b) 1.5% CaCl$_2$ prepared from commercially available 95–97% grade product.
(c) 1.5% MgCl$_2$ prepared from lab grade MgCl$_2$. 6H$_2$O.
(d) Viscosities determined on solutions prepared as follows:
(1) 10 parts of solution containing 1.0% polymer and 1.5% Ca(NO$_3$), mixed with 90 parts of 6 M Ca(NO$_3$)$_2$. Mixture then diluted 1:9 with H$_2$O before viscosity determined.
(2) 10 parts of solution containing 1.0% polymer and 1.5% CaCl$_2$ mixed with 90 parts of 5 M CaCl$_2$. Mixture then diluted 1:9 with H$_2$O before viscosity determined.
(3) 10 parts of solution containing 1.0% polymer and 1.5% MgCl$_2$ mixed with 90 parts of 3.94 M MgCl$_2$. Mixture then diluted 1:9 with water before viscosity determined.

TABLE 8
EFFECTS OF POLYMER AND BRINE TREATMENTS ON HYDRAULIC CONDUCTIVITIES AND SODIUM DISPLACEMENT FROM DM-20* TYPE SODIUM BENTONITE

| TREATMENT FLUID | Treatment vol. added (ml) to 100 ml slurry | Filtrate (ml.) collected in 15 min | Hydrallic Conductivity (cm/hr) × 10$^3$ | Na recovered from 3 g "soil" (mg) |
|---|---|---|---|---|
| Deionized water | 0 ml. | 5.2 | 2.15 | 1.86 |
| | 5 ml | 5.2 | 2.15 | 1.42 |
| | | 5.2 | 2.15 | 1.41 |
| 0.1% CFA-50 in water | 1 ml. | 6.1 | 2.53 | 1.78 |
| | 5 ml. | 6.0 | 2.48 | 1.76 |
| | 10 ml. | 6.5 | 2.69 | 1.85 |
| 5.4 M Ca(NO$_3$)$_2$ | 0.5 ml. | 15.0 | 6.21 | 9.87 |
| | 10 ml. | 16.2 | 6.70 | 14.57 |
| 0.1% CFA-50 in 5.4 M Ca(NO$_3$)$_2$ | 0.5 ml. | 13.8 | 5.71 | 11.12 |
| | 1 ml. | 15.1 | 6.25 | 13.09 |
| | 5 ml. | 13.8 | 5.71 | 13.13 |
| | 10 ml. | 20.6 | 8.53 | 19.85 |
| | 15 ml. | 23.0 | 9.52 | 20.85 |
| 0.01% CFA-50 in 0.54 Ca(NO$_3$)$_2$ | 5 ml. | 14.0 | 5.80 | 11.60 |
| 0.1% CFA-40 in water | 1 ml. | 6.3 | 2.61 | 1.98 |
| | 5 ml. | 6.5 | 2.69 | 2.00 |
| 0.1% CFA-40 in 5.4 M Ca(NO$_3$)$_2$ | 0.5 ml. | 13.8 | 5.71 | 8.67 |
| | 1 ml. | 15.1 | 6.25 | 9.97 |
| | 5 ml. | 16.4 | 6.79 | 11.65 |
| | 10 ml. | 22.8 | 9.44 | 17.29 |
| 0.1% PERCOL 140 in water | 0.5 ml. | 5.3 | 2.19 | 1.16 |
| | 5.0 ml. | 5.1 | 2.11 | 1.09 |
| | 10.0 ml. | 5.3 | 2.19 | 1.18 |
| 0.1% PERCOL 140 in 5.4 M Ca(NO$_3$)$_2$ | 0.5 ml. | 5.4 | 2.24 | 1.40 |
| | 1.0 ml. | 5.8 | 2.40 | 1.45 |
| | 5.0 ml. | 5.6 | 2.32 | 1.47 |
| | 10.0 ml. | 6.1 | 2.53 | 1.65 |
| 5.0 M CaCl$_2$ in water | 0.5 ml. | 7.3 | 3.02 | 4.77 |
| | 5.0 ml. | 17.2 | 7.12 | 15.71 |

TABLE 8-continued
EFFECTS OF POLYMER AND BRINE TREATMENTS ON HYDRAULIC CONDUCTIVITIES AND SODIUM DISPLACEMENT FROM DM-20* TYPE SODIUM BENTONITE

| TREATMENT FLUID | Treatment vol. added (ml) to 100 ml slurry | Filtrate (ml.) collected in 15 min | Hydralic Conductivity (cm/hr) × $10^3$ | Na recovered from 3 g "soil" (mg) |
|---|---|---|---|---|
| 0.1% CFA-50 in 4.5 M CaCl₂ | 10.0 ml. | 18.2 | 7.54 | 19.02 |
| | 0.5 ml. | 14.8 | 6.13 | 12.58 |
| | 1.0 ml. | 16.6 | 6.87 | 14.53 |
| | 5.0 ml. | 16.0 | 6.62 | 16.28 |
| | 15.0 ml. | 24.6 | 10.19 | 33.36 |
| 3.94 MgCl₂ in water | 0.5 ml. | 6.3 | 2.61 | 3.86 |
| | 5.0 ml. | 16.7 | 6.92 | 13.15 |
| | 10.0 ml. | 17.2 | 7.12 | 13.43 |
| 0.1% CFA-50 in 3.55 M MgCl₂ | 0.5 ml. | 12.8 | 5.30 | 7.73 |
| | 5.0 ml. | 20.0 | 8.28 | 14.06 |
| | 10.0 ml. | 21.0 | 8.70 | 15.09 |
| 0.1% CFA-70 in water | 1 ml. | 6.3 | 2.61 | 1.93 |
| | 5 ml. | 6.4 | 2.65 | 1.92 |
| 0.1% CFA-70 in 5.4 M Ca(NO₃)₂ | 0.5 ml. | 14.1 | 5.84 | 9.32 |
| | 1 ml. | 16.0 | 6.63 | 10.91 |
| | 5 ml. | 17.6 | 7.29 | 13.28 |
| | 10 ml. | 19.6 | 8.12 | 15.15 |
| 0.1% PERCOL 156 in water | 1 ml. | 6.3 | 2.61 | 1.92 |
| | 5 ml. | 7.4 | 3.06 | 2.37 |
| 0.1% PERCOL 156 in 5.4 M Ca(NO₃)₂ | 0.5 ml. | 14.3 | 5.92 | 10.11 |
| | 1 ml. | 16.0 | 6.63 | 12.71 |
| | 5 ml. | 18.2 | 7.54 | 16.08 |
| | 10 ml. | 19.9 | 8.24 | 17.99 |
| 0.1% SEPARAN AP 273 | 1 ml. | 6.1 | 2.53 | 1.81 |
| | 5 ml. | 6.3 | 2.61 | 1.81 |
| 0.1% SEPARAN AP 273 | 0.5 ml. | 15.0 | 6.21 | 12.30 |
| | 1 ml. | 17.1 | 7.08 | 13.82 |
| | 5 ml. | 17.8 | 7.37 | 15.46 |
| | 10 ml. | 22.6 | 9.36 | 21.39 |
| 0.1% CFN-10 in water | 1 ml. | 3.9 | 1.62 | 0.93 |
| | 5 ml. | 5.4 | 2.24 | 1.22 |
| | 10 ml. | 5.4 | 2.24 | 1.14 |
| 0.1% CFN-10 in 5.4 M Ca(NO₃)₂ | 0.5 ml. | 14.4 | 5.96 | 11.70 |
| | 1.0 ml. | 16.1 | 6.67 | 13.93 |
| | 5.0 ml. | 17.8 | 7.37 | 16.24 |
| | 10.0 ml. | 17.4 | 7.21 | 14.93 |

*Commercially available from Dow Chemical - Dowell Division

The preceding disclosure is not intended to be construed limitatively as various alterations and modifications falling within the true broad spirit and scope of the invention will be obvious to those skilled in the art.

I claim:

1. A process for the preparation of a stable, concentrated solution intended for subsequent aqueous dilution and application to sodium contaminated soils, comprising:
   (a) preparing an initial aqueous solution having a concentration in the range of from about 1 to 4% by weight of a water soluble calcium or magnesium salt and dissolving therein from about 1 to 2% by weight of a water soluble anionic polyacrylamide polymer having an average molecular weight of at least about 1,000,000;
   (b) preparing a substantially saturated aqueous solution of the water soluble calcium or magnesium salt employed in step (a); and
   (c) mixing from about 5 to 20% by volume of the polymer-containing solution of step (a) with from about 80 to 95% by volume of the substantially saturated solution of step (b) to obtain the stable, concentrated solution.

2. A process according to claim 1, wherein the water soluble calcium or magnesium salt is a calcium salt.

3. A process according to claim 2, wherein the calcium salt is selected from the group consisting of calcium nitrate and calcium chloride.

4. A process for the preparation of a stable, concentrated solution intended for subsequent aqueous dilution and application to sodium contaminated soils, comprising:
   (a) preparing an initial aqueous solution of calcium nitrate having a concentration in the range of from about 1 to 2% by weight and dissolving therein from about 1 to 2% by weight of a water soluble anionic polyacrylamide polymer having an average molecular weight of at least about 1,000,000;
   (b) preparing a substantially saturated aqueous solution of calcium nitrate; and
   (c) mixing from about 5 to 20% by volume of the polymer-containing solution of step (a) with from about 80 to 95% by volume of the substantially saturated solution of step (b) to obtain the stable, concentrated solution.

5. A process according to claim 4, wherein the anionic polyacrylamide polymer employed in step (a) has an average molecular weight in the range of from about 1,000,000 to 20,000,000.

6. A process according to claim 5 wherein from about 15 to about 30% of the active sites of the anionic polyacrylamide polymer are hydrolysed to anionic carboxyl functional groups.

7. A process for the preparation of a stable, concentrated solution intended for subsequent aqueous dilution and application to sodium contaminated soils, comprising:
(a) preparing an initial aqueous solution of calcium nitrate having a concentration in the range of from about 1 to 2% by weight and dissolving therein from about 1 to 2% by weight of a water soluble anionic polyacrylamide polymer having an average molecular weight in the range of from about 1,000,000 to 20,000,000 and wherein from about 22 to 27% of the active sites of the anionic polyacrylamide polymer have been hydrolyzed to anionic carboxyl functional groups;
(b) preparing a substantially saturated aqueous solution of calcium nitrate; and
(c) mixing from about 5 to 20% by volume of the polymer-containing solution of step (a) with from about 80 to 95% by volume of the substantially saturated solution of step (b) to obtain the stable, concentrated solution.

8. A process for the preparation of a stable, concentrated solution intended for subsequent aqueous dilution and application to sodium contaminated soils, comprising:
(a) preparing an initial aqueous solution of calcium nitrate having a concentration of about 2% by weight and dissolving therein from about 1 to 2% by weight of an anionic polyacrylamide polymer having an average molecular weight in the range of from about 10,000,000 to 20,000,000;
(b) preparing a substantially saturated aqueous solution of calcium nitrate; and
(c) mixing from about 5 to 10% by volume of the polymer containing solution of step (a) with about 90 to 95% by volume of the substantially saturated solution of step (b).

9. A process according to claim 8, wherein the substantially saturated aqueous solution of calcium nitrate of step (b) has a concentration of about 200% by weight.

10. A process for the preparation of a stable, concentrated solution intended for subsequent aqueous dilution and application to sodium contaminated soils, comprising:
(a) preparing an initial aqueous solution of calcium nitrate having a concentration of about 2% by weight and dissolving therein from about 1 to 2% by weight of an anionic polyacrylamide polymer having an average molecular weight of about 15,000,000 and about 22-27% of the active sites of the anionic polyacrylamide polymer have been hydrolyzed to anionic carboxyl functional groups;
(b) preparing a substantially saturated aqueous solution of calcium nitrate having a concentration of about 200% by weight; and
(c) mixing from about 5 to 10% by volume of the polymer containing solution of step (a) with about 90 to 95% by volume of the substantially saturated solution of step (b).

11. A method of productively reclaiming sodium contaminated soils, comprising applying to the surface of such soils an effective volume of a treatment solution obtained by diluting a concentrated solution according to claim 1 with sufficient water to provide a treatment solution having a viscosity of no more than about 3 cP at a shear rate of 511 reciprocal seconds (25° C.).

12. A method of productively reclaiming sodium contaminated soils, comprising applying to the surface of such soils an effective volume of a treatment solution obtained by diluting a concentrated solution according to claim 1, with water in a ratio of concentrated solution to water of about 1:7 to about 1:9.

13. A stable aqueous solution having a viscosity in the range of from about 3 to 10 cP (25° C.) and having a concentration of from about 160 to 190% by weight of calcium nitrate and from about 0.05 to 0.4% by weight of an anionic polyacrylamide of an average molecular weight in the range of about 1,000,000 to 20,000,000.

14. A process for the preparation of a stable, concentrated solution intended for subsequent aqueous dilution and application to sodium contaminated soils, comprising:
(a) preparing an initial aqueous solution of calcium nitrate having a concentration of about 2% by weight and dissolving therein from about 1% to 2% by weight of an anionic polyacrylamide has an average molecular weight of about 15,000,000 and about 35% to 40 % of the active sites of the anionic polyacrylamide polymer have been hydrolyzed to anionic carboxyl functional groups;
(b) preparing a substantially saturated aqueous solution of calcium nitrate having a concentration of about 200% by weight; and
(c) mixing from about 5% to 10% by volume of the polymer containing solution of step (a) with about 90% to 95% by volume of the substantially saturated solution of step (b).

15. A method of productively reclaiming sodium contaminated soils, comprising applying to the surface of such soils an effective volume of a treatment solution obtained by diluting a concentrated solution according to claim 14 with sufficient water to provide a treatment solution having a viscosity of no more than about 3 cP (25° C.).

16. A method of productively reclaiming sodium contaminated soils, comprising applying to the surface of such soils an effective volume of a treatment solution obtained by diluting a concentrated solution according to claim 14 with water in a ratio of concentrated solution to water of about 1:7 to about 1:9.

* * * * *

UNITED STATES PATENT AND TRADEMARK OFFICE
CERTIFICATE OF CORRECTION

PATENT NO. : 4,755,206

DATED : July 5, 1988

INVENTOR(S) : Clark et al

It is certified that error appears in the above-identified patent and that said Letters Patent is hereby corrected as shown below:

Abstract, line 10, "1,00,000" should read -- 1,000,000--.
Abstract line 11, before "preparing" insert -- (b) --.

Signed and Sealed this

Eleventh Day of April, 1989

Attest:

DONALD J. QUIGG

Attesting Officer

Commissioner of Patents and Trademarks